(12) United States Patent
Fisher et al.

(10) Patent No.: US 6,344,855 B1
(45) Date of Patent: *Feb. 5, 2002

(54) ENCAPSULATED NETWORK ENTITY REFERENCE OF A NETWORK COMPONENT SYSTEM FOR INTEGRATING OBJECT ORIENTED SOFTWARE COMPONENTS

(75) Inventors: Stephen Fisher; Michael A. Cleron, both of Menlo Park; Timo Bruck, Mountain View, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,710

(22) Filed: Jul. 26, 1999

Related U.S. Application Data

(63) Continuation of application No. 09/007,691, filed on Jan. 15, 1998, now Pat. No. 5,929,852, which is a continuation of application No. 08/435,880, filed on May 5, 1995, now abandoned.

(51) Int. Cl.⁷ .......................... G06F 16/15; G06F 15/00
(52) U.S. Cl. ................... 345/500.1; 345/739; 345/804; 709/218
(58) Field of Search .......................... 707/500.1; 717/1; 345/804, 739; 709/218

(56) References Cited

U.S. PATENT DOCUMENTS

| | | |
|---|---|---|
| 5,202,828 A | 4/1993 | Verelney |
| 5,481,666 A | 1/1996 | Nguyen et al. |
| 5,500,929 A | 3/1996 | Dickerson |
| 5,530,852 A | 6/1996 | Meske, Jr. et al. |

(List continued on next page.)

FOREIGN PATENT DOCUMENTS

WO 91/07719 5/1991

OTHER PUBLICATIONS

Relihan, Liam et al., Untangling the World–Wide–Web, Annual ACM Conference on Systems Documentation, pp. 17–24, Oct. 1994.*

Leone, Andrea O. et al., Towards a user environment integrating hypermedia browsers, scientific visualization programs and numerical simulation programs, ACM Proceedings of the workshop on Advanced visual interfaces, pp. 234–236, Jun. 1994.*

Baker, S. Mosaic–Surfing at Home and Abroad, Proceedings ACM Siguccs User Services Conference XXII, Oct. 16–19, 1994, pp. 159–163.

Develop, The Apple Technical Journal, "Building an Open-Doc Part Handler", Issue 19 Sep., 1994, pp. 6–16.

Hess, R., MacWeek, Nov. 7, 1994, vol. 8, No. 44, Cyberdog to Fetch Internet Resources for OpenDoc APPS.

Norr, H., MacWeek, Nov. 14, 1994, The Second Decade, Cyberdog Could be a Breakthrough if it's Kept on a Leash.

Primary Examiner—Joseph H. Feild
Assistant Examiner—William L. Bashore
(74) Attorney, Agent, or Firm—Cesari and McKenna, LLP

(57) ABSTRACT

A network-oriented component system efficiently accesses information from a network resource located on a computer network by creating an encapsulated network entity that contains a reference to that resource. The encapsulated entity is preferably implemented as a network component stored on a computer remotely displaced from the referenced resource. In addition, the encapsulated entity may be manifested as a visual object on a graphical user interface of a computer screen. Such visual manifestation allows a user to easily manipulate the entity in order to display the contents of the resource on the screen or to electronically forward the entity over the network.

11 Claims, 14 Drawing Sheets

U.S. PATENT DOCUMENTS

| | | |
|---|---|---|
| 5,537,546 A | 7/1996 | Sauter |
| 5,548,722 A | 8/1996 | Jalalian et al. |
| 5,574,862 A | 11/1996 | Marianetti, II |
| 5,659,791 A | 8/1997 | Nakajima et al. |
| 5,724,506 A | 3/1998 | Cleron et al. |
| 5,724,556 A | 3/1998 | Souder et al. |
| 5,781,189 A | 7/1998 | Holleran et al. |
| 5,808,611 A * | 9/1998 | Johnson et al. ............. 345/804 |
| 5,819,090 A | 10/1998 | Wolf et al. |
| 5,907,704 A * | 5/1999 | Gudmundson et al. ........ 717/1 |
| 5,929,852 A * | 7/1999 | Fisher et al. ................ 345/735 |
| 6,125,388 A * | 9/2000 | Reisman ..................... 709/218 |

* cited by examiner

ENCAPSULATED NETWORK ENTITY REFERENCE OF A NETWORK COMPONENT SYSTEM FOR INTEGRATING OBJECT ORIENTED SOFTWARE COMPONENTS

CROSS-REFERENCE TO RELATED APPLICATIONS

This application is a continuation of application Ser. No. 09/007,691, filed Jan. 15, 1998, now U.S. Pat. No. 5,929,852, which is a continuation of application Ser. No. 08/435,880, filed May 5, 1995, abandoned.

This invention is related to the following copending U.S. Patent Applications:

U.S. patent application Ser. No. 08/435,377, titled EXTENSIBLE, REPLACEABLE NETWORK COMPONENT SYSTEM;

U.S. patent application Ser. No. 08/435,374, titled REPLACEABLE AND EXTENSIBLE NOTEBOOK COMPONENT OF A NETWORK COMPONENT SYSTEM;

U.S. patent application Ser. No. 08/435,862, titled REPLACEABLE AND EXTENSIBLE LOG COMPONENT OF A NETWORK COMPONENT SYSTEM;

U.S. patent application Ser. No. 08/435,213, titled REPLACEABLE AND EXTENSIBLE CONNECTION DIALOG COMPONENT OF A NETWORK COMPONENT SYSTEM; and U.S. patent application Ser. No. 08/435,671, titled EMBEDDING INTERNET BROWSER/BUTTONS WITHIN COMPONENTS OF A NETWORK COMPONENT SYSTEM, each of which was filed May 5, 1995 and assigned to the assignee of the present invention.

FIELD OF THE INVENTION

This invention relates generally to computer networks and, more particularly, to an architecture and tools for building Internet-specific services.

BACKGROUND OF THE INVENTION

The Internet is a system of geographically distributed computer networks interconnected by computers executing networking protocols that allow users to interact and share information over the networks. Because of such wide-spread information sharing, the Internet has generally evolved into an "open" system for which developers can design software for performing specialized operations, or services, essentially without restriction. These services are typically implemented in accordance with a client/server architecture, wherein the clients, e.g., personal computers or workstations, are responsible for interacting with the users and the servers are computers configured to perform the services as directed by the clients.

Not surprisingly, each of the services available over the Internet is generally defined by its own networking protocol. A protocol is a set of rules governing the format and meaning of messages or "packets" exchanged over the networks. By implementing services in accordance with the protocols, computers cooperate to perform various operations, or similar operations in various ways, for users wishing to "interact" with the networks. The services typically range from browsing or searching for information having a particular data format using a particular protocol to actually acquiring information of a different format in accordance with a different protocol.

For example, the file transfer protocol (TP) service facilitates the transfer and sharing of files across the Internet. The Telnet service allows users to log onto computers coupled to the networks, while the netnews protocol provides a bulletin-board service to its subscribers. Furthermore, the various data formats of the information available on the Internet include JPEG images, MPEG movies and $\mu$-law sound files.

Two fashionable services for accessing information over the Internet are Gopher and the World-Wide Web ("Web"). Gopher consists of a series of Internet servers that provide a "list-oriented" interface to information available on the networks; the information is displayed as menu items in a hierarchical manner. Included in the hierarchy of menus are documents, which can be displayed or saved, and searchable indexes, which allow users to type keywords and perform searches.

Some of the menu items displayed by Gopher are links to information available on other servers located on the networks. In this case, the user is presented with a list of available information documents that can be opened. The opened documents may display additional lists or they may contain various data-types, such as pictures or text; occasionally, the opened documents may "transport" the user to another computer on the Internet.

The other popular information service on the Internet is the Web. Instead of providing a user with a hierarchical list-oriented view of information, the Web provides the user with a "linked-hypertext" view. Metaphorically, the Web perceives the Internet as a vast book of pages, each of which may contain pictures, text, sound, movies or various other types of data in the form of documents. Web documents are written in HyperText Markup Language (HTML) and Web servers transfer HTML documents to each other through the HyperText Transfer Protocol (HTTP).

The Web service is essentially a means for naming sources of information on the Internet. Armed with such a general naming convention that spans the entire network system, developers are able to build information servers that potentially any user can access. Accordingly, Gopher servers, HTTP servers, FTP servers, and E-mail servers have been developed for the Web. Moreover, the naming convention enables users to identify resources (such as documents) on any of these servers connected to the Internet and allow access to those resources.

As an example, a user "traverses" the Web by following hot items of a page displayed on a graphical Web browser. These hot items are hypertext links whose presence are indicated on the page by visual cues, e.g., underlined words, icons or buttons. When a user follows a link (usually by clicking on the cue with a mouse), the browser displays the target pointed to by the link which, in some cases, may be another HTML document.

The Gopher and Web information services represent entirely different approaches to interacting with information on the Internet. One follows a list-approach to information that "looks" like a telephone directory service, while the other assumes a page-approach analogous to a tabloid newspaper. However, both of these approaches include applications for enabling users to browse information available on Internet.servers. Additionally, each of these applications has a unique way of viewing and accessing the information on the servers.

Netscape Navigator™ ("Netscape") is an example of a monolithic Web browser application that is configured to interact with many of the previously-described protocols, including HTTP, Gopher and FTP. When instructed to invoke an application that uses one of these protocols, Netscape "translates" the protocol to hypertext. This translation places the user farther away from the protocol designed to run the application and, in some cases, actually thwarts the user's Internet experience. For example, a discussion system requiring an interactive exchange between participants may be bogged down by hypertext translations.

The Gopher and Web services may farther require additional applications to perform specific functions, such as playing sound or viewing movies, with respect to the data types contained in the documents. For example, Netscape employs helper applications for executing applications having data formats it does not "understand". Execution of these functions on a computer requires interruption of processing and context switching (i.e., saving of state) prior to invoking the appropriate application. Thus, if a user operating within the Netscape application "opens" a MPEG movie, that browsing application must be saved (e.g., to disk) prior to opening an appropriate MPEG application, e.g., Sparkle, to view the image. Such an arrangement is inefficient and rather disruptive to processing operations of the computer.

Typically, a computer includes an operating system and application software which, collectively, control the operations of the computer. The applications are preferably task-specific and independent, e.g., a word processor application edits words, a drawing application edits drawings and a database application interacts with information stored on a database storage unit. Although a user can move data from one application to the other, such as by copying a drawing into a word processing file, the independent applications must be invoked to thereafter manipulate that data.

Generally, the application program presents information to a user through a window of a graphical user interface by drawing images, graphics or text within the window region. The user, in turn, communicates with the application by "pointing" at graphical objects in the window with a pointer that is controlled by a hand-operated pointing device, such as a mouse, or by pressing keys of a keyboard.

The graphical objects typically included with each window region are sizing boxes, buttons and scroll bars. These objects represent user interface elements that the user can point at with the pointer (or a cursor) to select or manipulate. For example, the user may manipulate these elements to move the windows around on the display screen, and change their sizes and appearances so as to arrange the window in a convenient manner. When the elements are selected or manipulated, the underlying application program is informed, via the window environment, that control has been appropriated by the user.

A menu bar is a further example of a user interface element that provides a list of menus available to a user. Each menu, in turn, provides a list of command options that can be selected merely by pointing to them with the mouse-controlled pointer. That is, the commands may be issued by actuating the mouse to move the pointer onto or near the command selection, and pressing and quickly releasing, i.e., "clicking" a button on the mouse.

In contrast to this typical application-based computing environment, a software component architecture provides a modular document-based computing arrangement using tools such as viewing editors. The key to document-based computing is the compound document, i.e., a document composed of many different types of data sharing the same file. The types of data contained in a compound document may range from text, tables and graphics to video and sound. Several editors, each designed to handle a particular data type or format, can work on the contents of the document at the same time, unlike the application-based computing environment.

Since many editors may work together on the same document, the compound document is apportioned into individual modules of content for manipulation by the editors. The compound-nature of the document is realized by embedding these modules within each other to create a document having a mixture of data types. The software component architecture provides the foundation for assembling documents of differing contents and the present-invention is directed to a system for extending this capability to network-oriented services.

To remotely access information stored on a resource of the network, the user typically invokes a service configured to operate in accordance with a protocol for accessing the resource. In particular, the user types an explicit destination address command that includes a uniform resource locator (URL). The URL is a rather long (approximately 50 character) address pointer that identifies both a network resource and a means for accessing that resource. The following is an example of a hypothetical URL address pointer to a remote resource on a Web server:

http:/aaaabbb.cc/hypertext/DdddEeeee/WWW/Fffffff.html

It is apparent that having to type such long destination address pointers can become quite burdensome for users that frequently access information from remote resources.

Therefore, it is among the objects of the present invention to simplify a user's experience on computer networks without sacrificing the flexibility afforded the user by employing existing protocols and data types available on those networks.

Another object of the invention is to provide a system for users to search and access information on the Internet without extensive understanding or knowledge of the underlying protocols and data formats needed to access that information.

Still another object of the invention is to provide users with a simple means for remotely accessing information stored on resources connected to computer networks.

SUMMARY OF THE INVENTION

Briefly, the invention comprises a network-oriented component system for efficiently accessing information from a network resource located on a computer network by creating an encapsulated network entity that contains a reference to that resource. The encapsulated entity is preferably implemented as a network component stored on a computer remotely displaced from the referenced resource. In addition, the encapsulated entity may be manifested as a visual object on a graphical user interface of a computer screen. Such visual manifestation allows a user to easily manipulate the entity in order to display the contents of the resource on the screen or to electronically forward the entity over the network.

In the illustrative embodiment of the invention, the reference to the network resource is preferably a "pointer", such as a uniform resource locator (URL), that identifies the network address of the resource, e.g., a Gopher browser or a Web page. In addition to storing the pointer, the encapsulated entity also contains information for involving appropriate network components needed to access the resource. Communication among the network components is achieved through novel application programming interfaces (APIs) to facilitate integration with an underlying software component architecture. Such a cooperating architecture allows the encapsulated entity and network components to "transport" the user to the network location of the remote resource.

Specifically, the encapsulated entity component is an object of the network-oriented component system that is preferably embodied as a customized framework having a set of interconnected abstract classes. A CyberItem class defines the encapsulated entity object which interacts with other objects of the network system to remotely access information from the referenced resource. Since these objects are integral elements of the cooperating component architecture, any type of encapsulated network entity may be developed with consistent behaviors, i.e., these entities may be manifested as visual objects that can be distributed and manipulated iconically.

Advantageously, the inventive encapsulation technique described herein provides a user with a simple means for accessing information on computer networks.

BRIEF DESCRIPTION OF THE DRAWINGS

The above and further advantages of the invention may be better understood by referring to the following description in conjunction with the accompanying drawings in which.

DETAILED DESCRIPTION OF ILLUSTRATIVE EMBODIMENT

Figure 1:
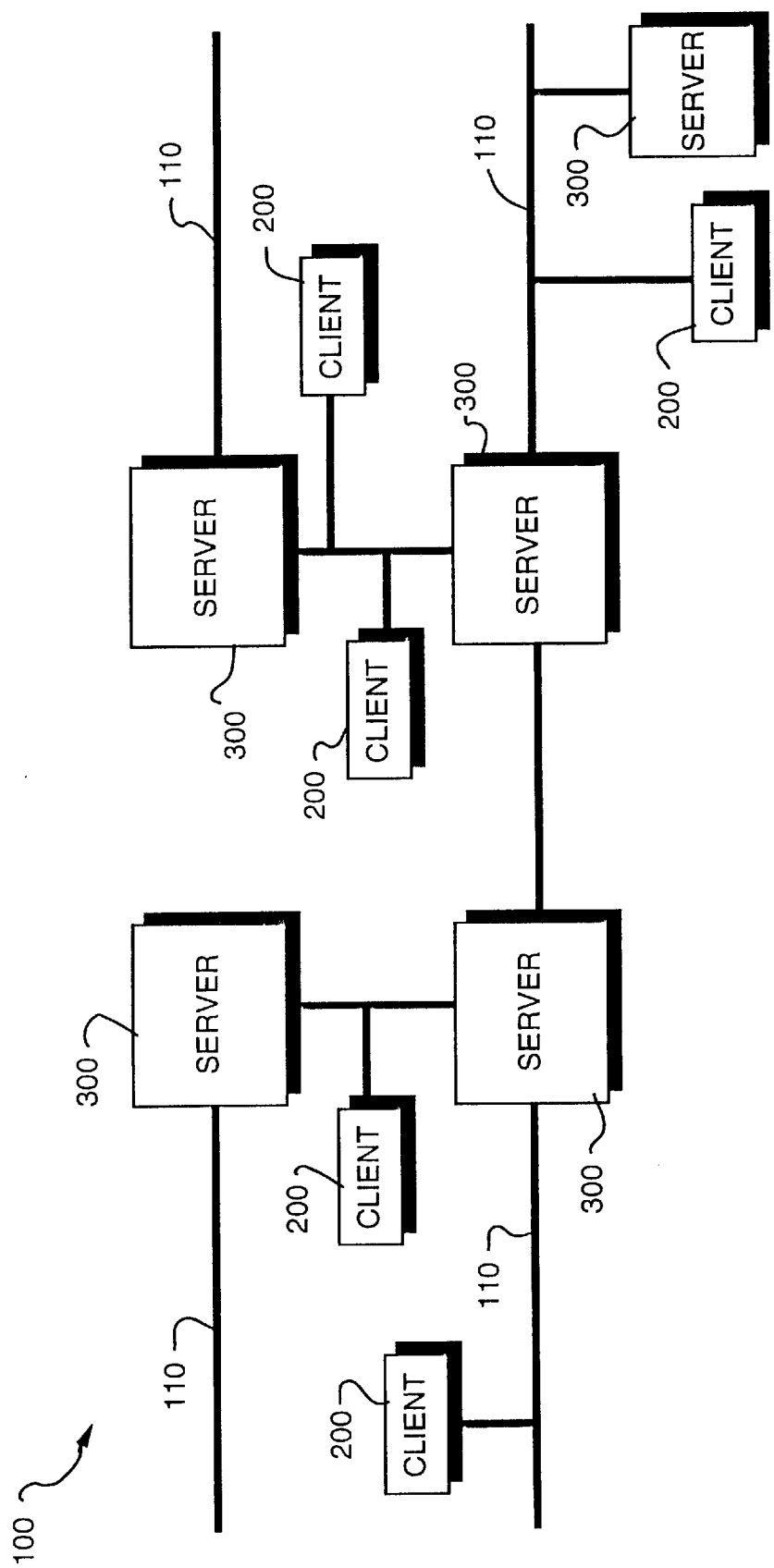
FIG. 1 is a block diagram of a network system including a collection of computer networks interconnected by client and server computers.

FIG. 1 is a block diagram of a network system 100 comprising a collection of computer networks 110 interconnected by client computers ("clients") 200, e.g., workstations or personal computers, and server computers ("servers") 300. The servers are typically computers having hardware and software elements that provide resources or services for use by the clients 200 to increase the efficiency of their operations. It will be understood to those skilled in the art that, in an alternate embodiment, the client and server may exist on the same computer; however, for the illustrative embodiment described herein, the client and server are separate computers.

Several types of computer networks 110, including local area networks (LANs) and wide area networks (WANs), may be employed in the system 100. A LAN is a limited area network that typically consists of a transmission medium, such as coaxial cable or twisted pair, while a WAN may be a public or private telecommunications facility that interconnects computers widely dispersed. In the illustrative embodiment, the network system 100 is the Internet system of geographically distributed computer networks.

Computers coupled to the Internet typically communicate by exchanging discrete packets of information according to predefined networking protocols. Execution of these networking protocols allow users to interact and share information across the networks. As an illustration, in response to a user's request for a particular service, the client 200 sends an appropriate information packet to the server 300, which performs the service and returns a result back to the client 200.

Figure 2:
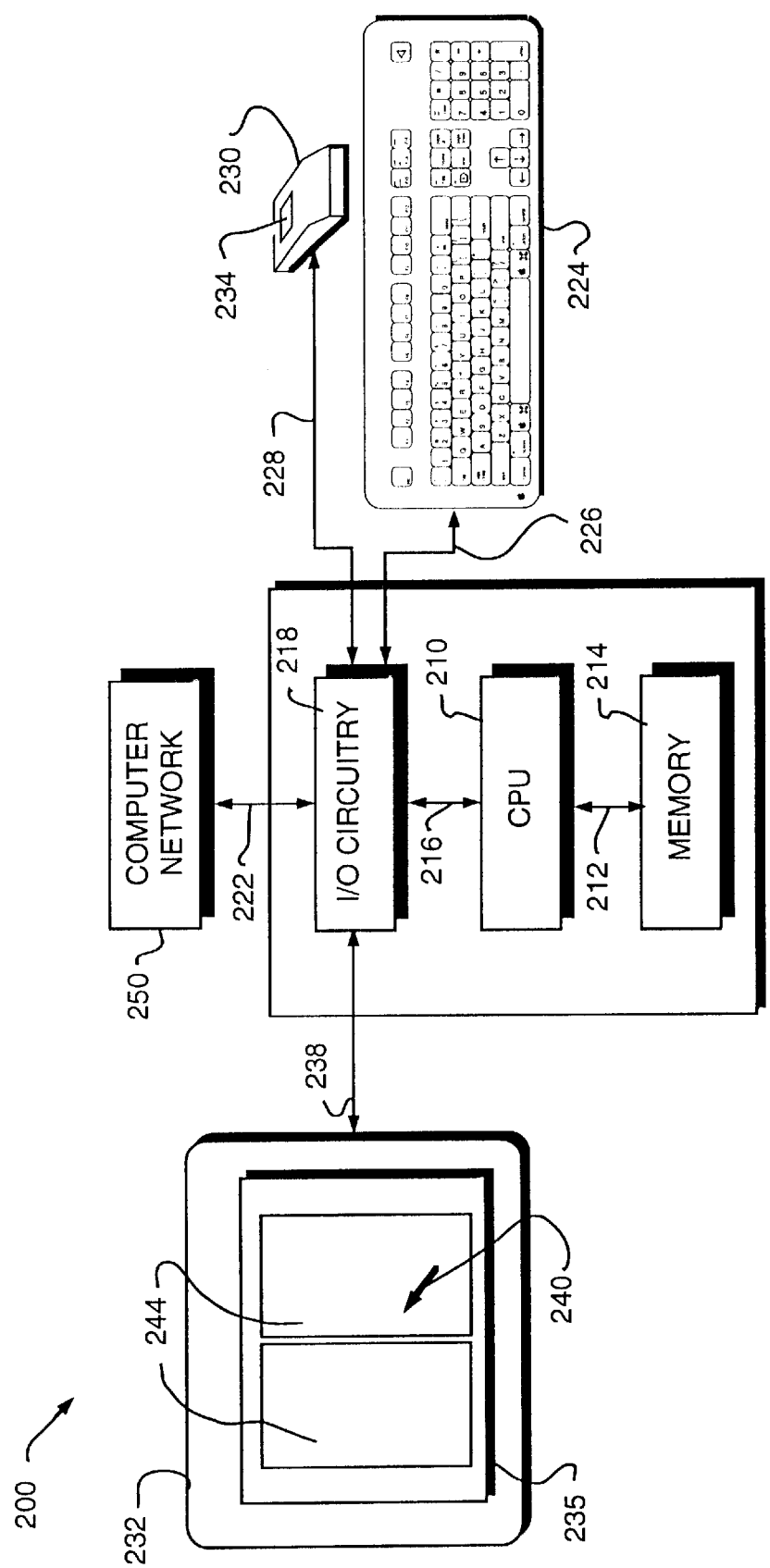
FIG. 2 is a block diagram of a client computer, such as a personal computer, on which the invention may advantageously operate.

FIG. 2 illustrates a typical hardware configuration of a client 200 comprising a central processing unit (CPU) 210 coupled between a memory 214 and input/output (I/O) circuitry 218 by bidirectional buses 212 and 216. The memory 214 typically comprises random access memory (RAM) for temporary storage of information and read only memory (ROM) for permanent storage of the computer's configuration and basic operating commands, such as portions of an operating system (not shown). As described further herein, the operating system controls the operations of the CPU 210 and client computer 200.

The I/O circuitry 218, in turn, connects the computer to computer networks, such as the Internet networks 250, via a bidirectional bus 222 and to cursor/pointer control devices, such as a keyboard 224 (via cable 226) and a mouse 230 (via cable 228). The mouse 230 typically contains at least one button 234 operated by a user of the computer. A conventional display monitor 232 having a display screen 235 is also connected to I/O circuitry 218 via cable 238. A pointer (cursor) 240 is displayed on windows 244 of the screen 235 and its position is controllable via the mouse 230 or the keyboard 224, as is well-known. The I/O circuitry 218 receives information, such as control and data signals, from the mouse 230 and keyboard 224, and provides that information to the CPU 210 for display on the screen 235 or, as described further herein, for transfer over the Internet 250.

Figure 3:
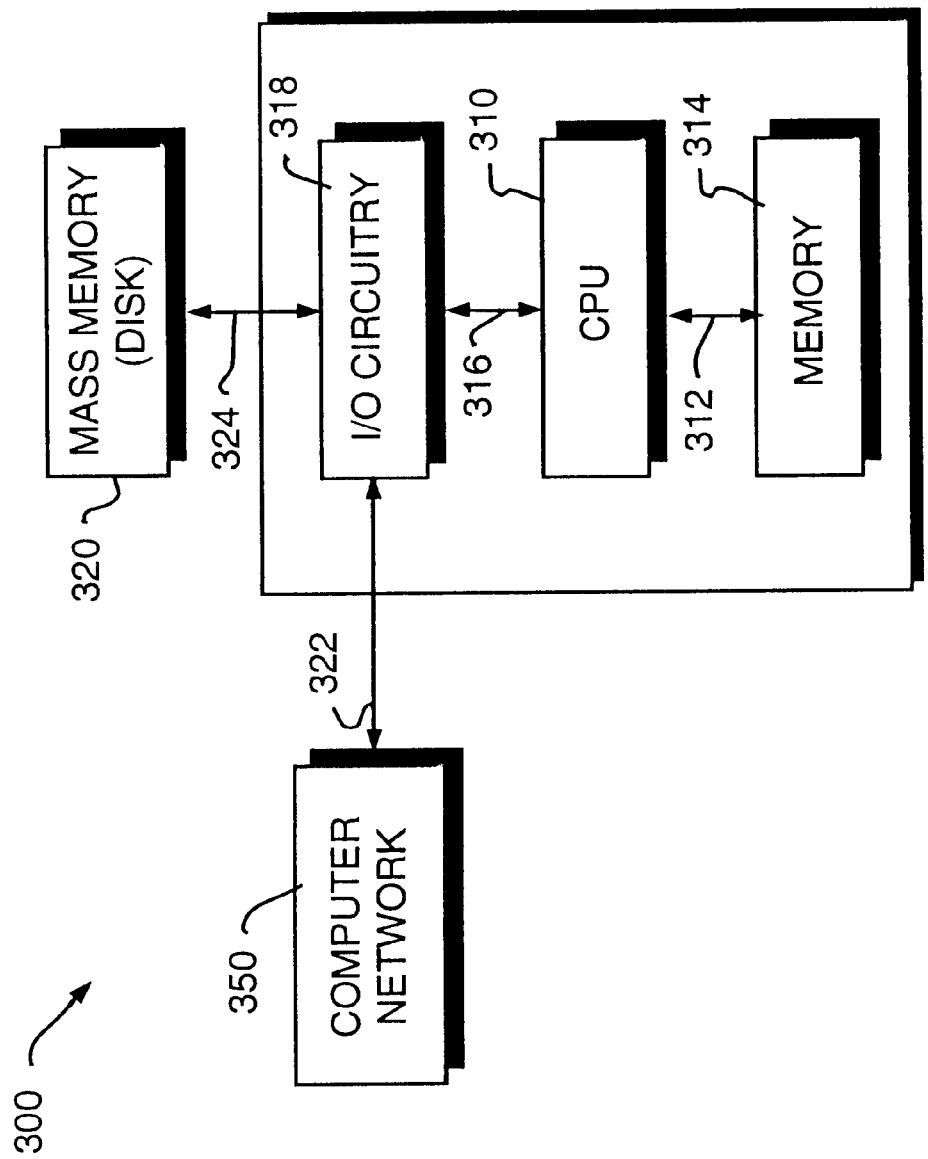
FIG. 3 is a block diagram of the server computer of FIG. 1.

FIG. 3 illustrates a typical hardware configuration of a server 300 of the network system 100. The server 300 has many of the same units as employed in the client 200, including a CPU 310, a memory 314 and I/O circuitry 318, each of which are interconnected by bidirectional buses 312 and 316. Also, the I/O circuitry connects the computer to computer networks 350 via a bidirectional bus 322. These units are configured to perform functions similar to those provided by their corresponding units in the computer 200. In addition, the server typically includes amass storage unit 320, such as a disk drive, connected to the I/O circuitry 318 via bidirectional bus 324.

It is to be understood that the I/O circuits within the computers 200 and 300 contain the necessary hardware, e.g., buffers and adapters, needed to interface with the control devices, the display monitor, the mass storage unit and the network. Moreover, the operating system includes the necessary software drivers; to control, e.g., network adapters within the I/O circuits when performing I/O operations, such as the transfer of data packets between the client 200 and server 300.

The computers are preferably personal computers of the Macintosh® series of computers sold by Apple Computer Inc., although the invention may also be practiced in the context of other types of computers, including the IBM® series of computers sold by International Business Machines Corp. These computers have resident thereon, and are controlled and coordinated by, operating system software, such as the Apple® System 7®, IBM OS2®, or the Microsoft® Windows® operating systems.

Figure 4:
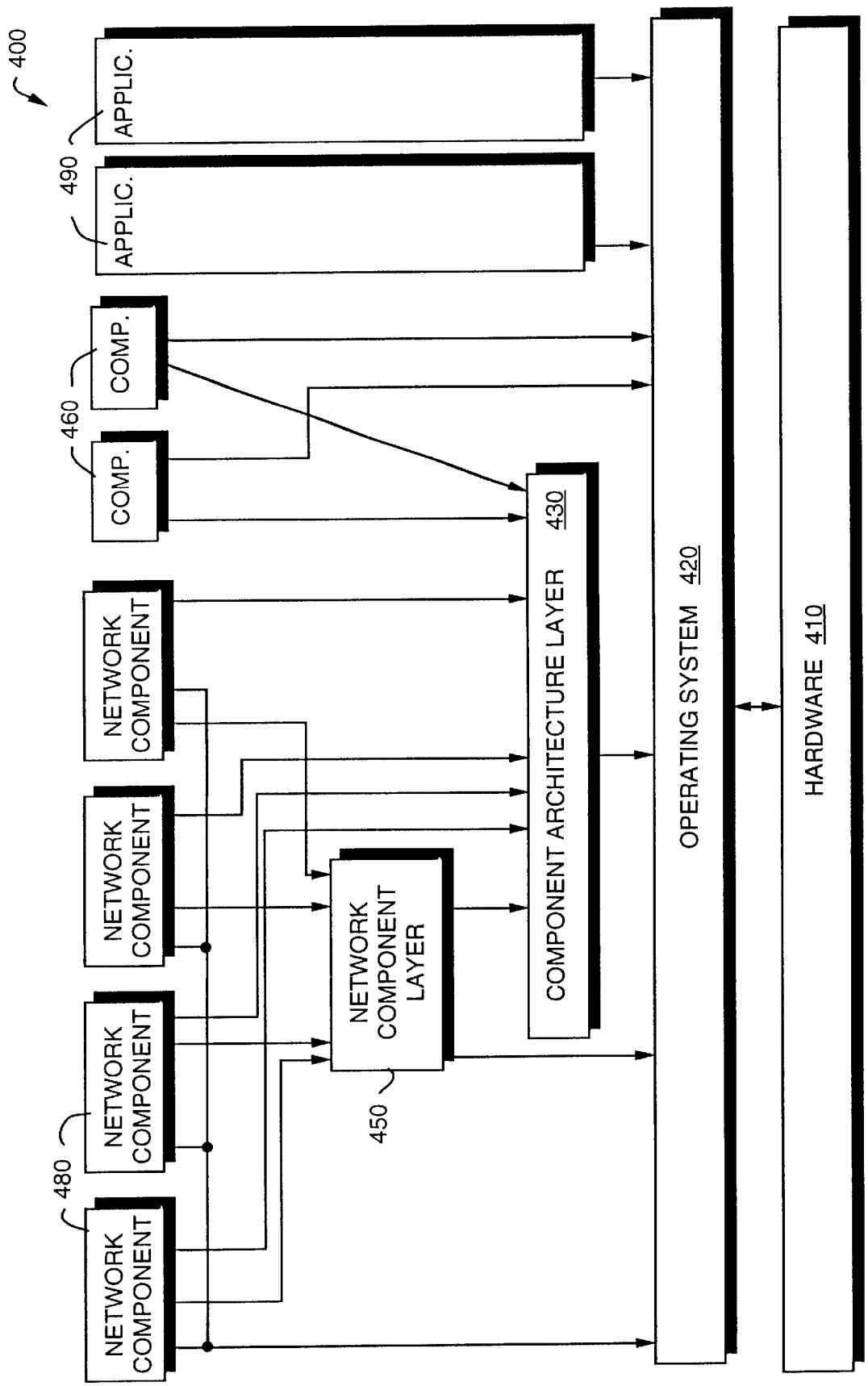
FIG. 4 is a highly schematized block diagram of a layered component computing arrangement in accordance with the invention.

As noted, the present invention is based on a modular document computing arrangement as provided by an underlying software component architecture, rather than the typical application-based environment of prior computing systems. FIG. 4 is a highly schematized diagram of the hardware and software elements of a layered component computing arrangement 400 that includes the novel network-oriented component system of the invention. At the lowest level there is the computer hardware, shown as layer 410. Interfacing with the hardware is a conventional operating system layer 420 that includes a window manager, a graphic system, a file system and network-specific interfacing, such as a TCPAIP protocol stack and an Appletalk protocol stack.

The software component architecture is preferably implemented as a component architecture layer 430. Although it is shown as overlaying the operating system 420, the component architecture layer 430 is actually independent of the operating system and, more precisely, resides side-by-side with the operating system. This relationship allows the component architecture to exist on multiple platforms that employ different operating systems.

In accordance with the present invention, a novel network-oriented component layer 450 contains the underlying technology for creating encapsulated entity components that contain references to network resources located on computer networks. As described further herein, communication among these components is achieved through novel application programming interfaces (APIs) to ensure integration with the underlying component architecture layer 430. These novel APIs are preferably delivered in the form of objects in a class hierarchy.

It should be noted that the network component layer 450 may operate with any existing system-wide component architecture, such as the Object Linking and Embedding (OLE) architecture developed by the Microsoft Corporation; however, in the illustrative embodiment, the component architecture is preferably OpenDoc, the vendor-neutral, open standard for compound documents developed by, among others, Apple Computer, Inc.

Using tools such as viewing editors, the component architecture layer 430 creates a compound document composed of data having different types and formats. Each differing data type and format is contained in a fundamental unit called a computing part or, more generally, a "component" 460 comprised of a viewing editor along with the data content. An example of the computing component 460 may include a MacDraw component. The editor, on the other hand, is analogous to an application program in a conventional computer. That is, the editor is a software component which provides the necessary functionality to display a component's contents and, where appropriate, present a user interface for modifying those contents. Additionally, the editor may include menus, controls and other user interface elements. The network component layer 450 extends the functionality of the underlying component architecture layer 430 by defining network-oriented components 480 that seamlessly integrate with these components 460 to provide basic tools for efficiently accessing information from network resources located on, e.g., servers coupled to the computer networks.

FIG. 4 also illustrates the relationship of applications 490 to the elements of the document computing arrangement 400. Although they reside in the same "user space" as the components 460 and network components 480, the applications 490 do not interact with these elements and, thus, interface directly to the operating system layer 420. Because they are designed as monolithic, autonomous modules, applications (such as previous Internet browsers) often do not even interact among themselves. In contrast, the components of the arrangement 400 are designed to work together and communicate via the common component architecture layer 430 or, in the case of the network components, via the novel network component layer 450.

Specifically, the invention features the provision of the network-oriented component system which, when invoked, causes actions to take place that enhance the ability of a user to interact with the computer to create encapsulated entities that contain references to network resources located on computer networks, such as the Internet. The encapsulated entities are manifested as visual objects to a user via a window environment, such as the graphical user interface provided by System 7 or Windows, that is preferably displayed on the screen 235 (FIG. 2) as a graphical display to facilitate interactions between the user and the computer, such as the client 200. This behavior of the system is brought about by the interaction of the network components with a series of system software routines associated with the operating system 420. These system routines, in turn, interact with the component architecture layer 430 to create the windows and graphical user interface elements, as described further herein.

The window environment is generally part of the operating system software 420 that includes a collection of utility programs for controlling the operation of the computer 200. The operating system, in turn, interacts with the components to provide higher level functionality, including a direct interface with the user. A component makes use of operating system functions by issuing a series of task commands to the operating system via the network component layer 450 or, as is typically the case, through the component architecture layer 430. The operating system 420 then performs the requested task. For example, the component may request that a software driver of the operating system initiate transfer of a data packet over the networks 250 or that the operating system display certain information on a window for presentation to the user.

Figure 5:
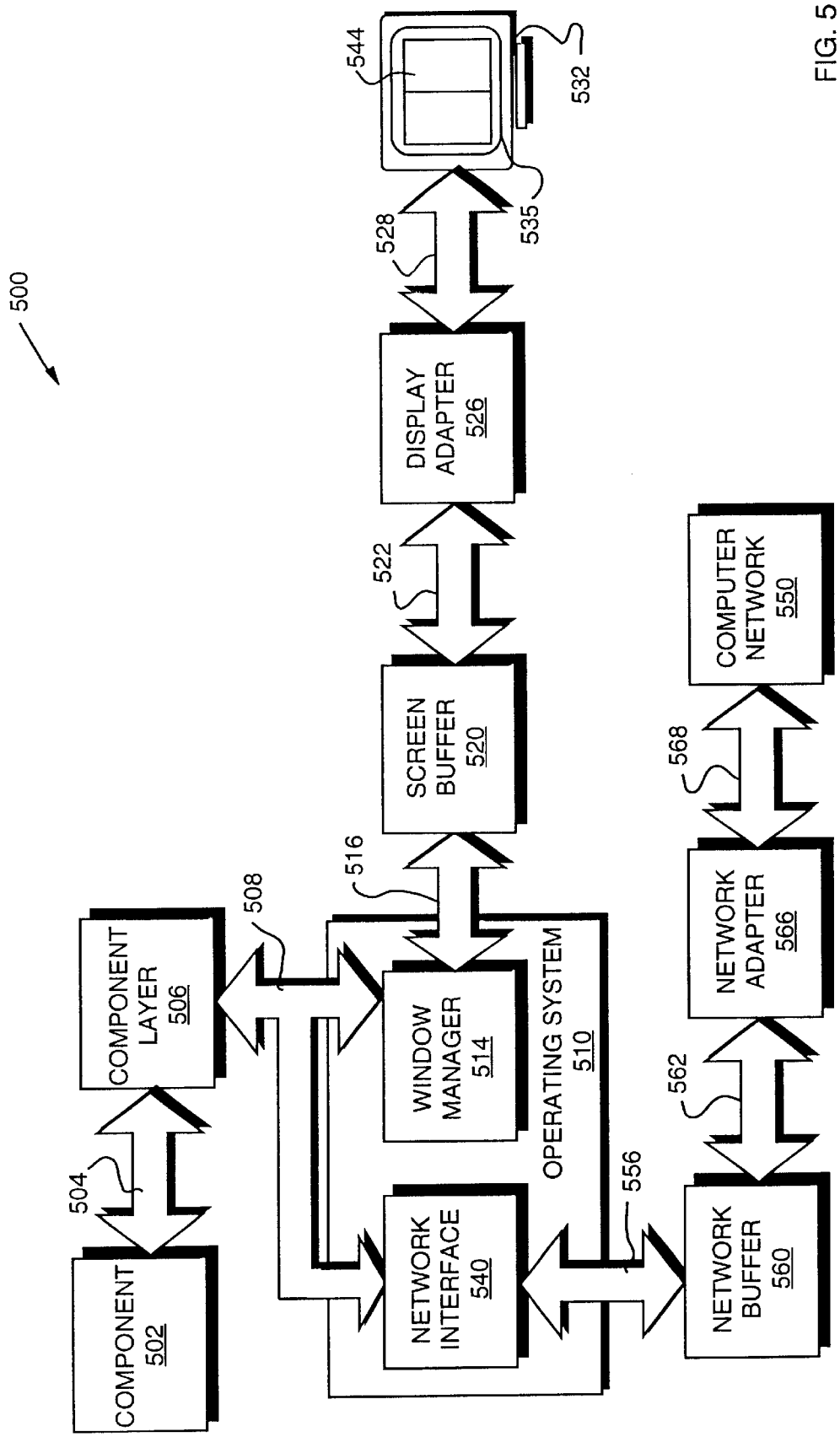
FIG. 5 is a schematic illustration of the interaction of a component, a software component layer and an operating system of the computer of FIG. 2.

FIG. 5 is a schematic illustration of the interaction of a component 502, software component layer 506 and an operating system 510 of a computer 500, which is similar to, and has equivalent elements of, the client computer 200 of FIG. 2. As noted, the network component layer 450 (FIG. 4) is integrated with the component architecture layer 430 to provide a cooperating architecture that allows any encapsulated entity and network component to "transport" the user to the network location of a remote resource; accordingly, for purposes of the present discussion, the layers 430 and 450 may be treated as a single software component layer 506.

The component 502, component layer 506 and operating system 510 interact to control and coordinate the operations of the computer 500 and their interaction is illustrated schematically by arrows 504 and 508. In order to display information on a screen display 535, the component-502 and component layer 506 cooperate to generate and send display commands to a window manager 514 of the operating system 510. The window manager 514 stores information directly (via arrow 516) into a screen buffer 520.

The window manager 514 is a system software routine that is generally responsible for managing windows 544 that the user views during operation of the network component system. That is, it is generally the task of the window manager to keep track of the location and size of the window and window areas which must be drawn and redrawn in connection with the network component system of the present invention.

Under control of various hardware and software in the system, the contents of the screen buffer 520 are read out of the buffer and provided, as indicated schematically by arrow 522, to a display adapter 526. The display adapter contains hardware and software (sometimes in the form of firmware) which converts the information in the screen buffer 520 to a form which can be used to drive a display screen 535 of a monitor 532. The monitor 532 is connected to display adapter 526 by cable 528.

Similarly, in order to transfer information as a packet over the computer networks, the component 502 and component layer 506 cooperate to generate and send network commands, such as remote procedure calls, to a network-specific interface 540 of the operating system 510. The network interface comprises system software routines, such as "stub" procedure software and protocol stacks, that are generally responsible for formating the information into a predetermined packet format according to the specific network protocol used, e.g., TCP/IP or Apple-talk protocol.

Specifically, the network interface 540 stores the packet directly (via arrow 556) into a network buffer 560. Under control of the hardware and software in the system, the contents of the network buffer 560 are provided, as indicated schematically by arrow 562, to a network adapter 566. The network adapter incorporates the software and hardware, i.e., electrical and mechanical interchange circuits and characteristics, needed to interface with the particular computer networks 550. The adapter 566 is connected to the computer networks 550 by cable 568.

In a preferred embodiment, the invention described herein is implemented in an object-oriented programming (OOP) language, such as C++, "using System Object Model (SOM) technology and OOP techniques. The C++ and SOM languages are well-known and many articles and texts are available which describe the languages in detail. In addition, C++and SOM compilers are commercially available from several vendors. Accordingly, for reasons of clarity, the details of the C++ and SOM languages and the operations of their compilers will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like computers, while also modeling as abstract concepts like numbers or geometrical designs.

Objects are defined by creating "classes" which are not objects themselves, but which act as templates that instruct the compiler how to construct an actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. More specifically, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions that have the same overall format, but that work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Figure 6:
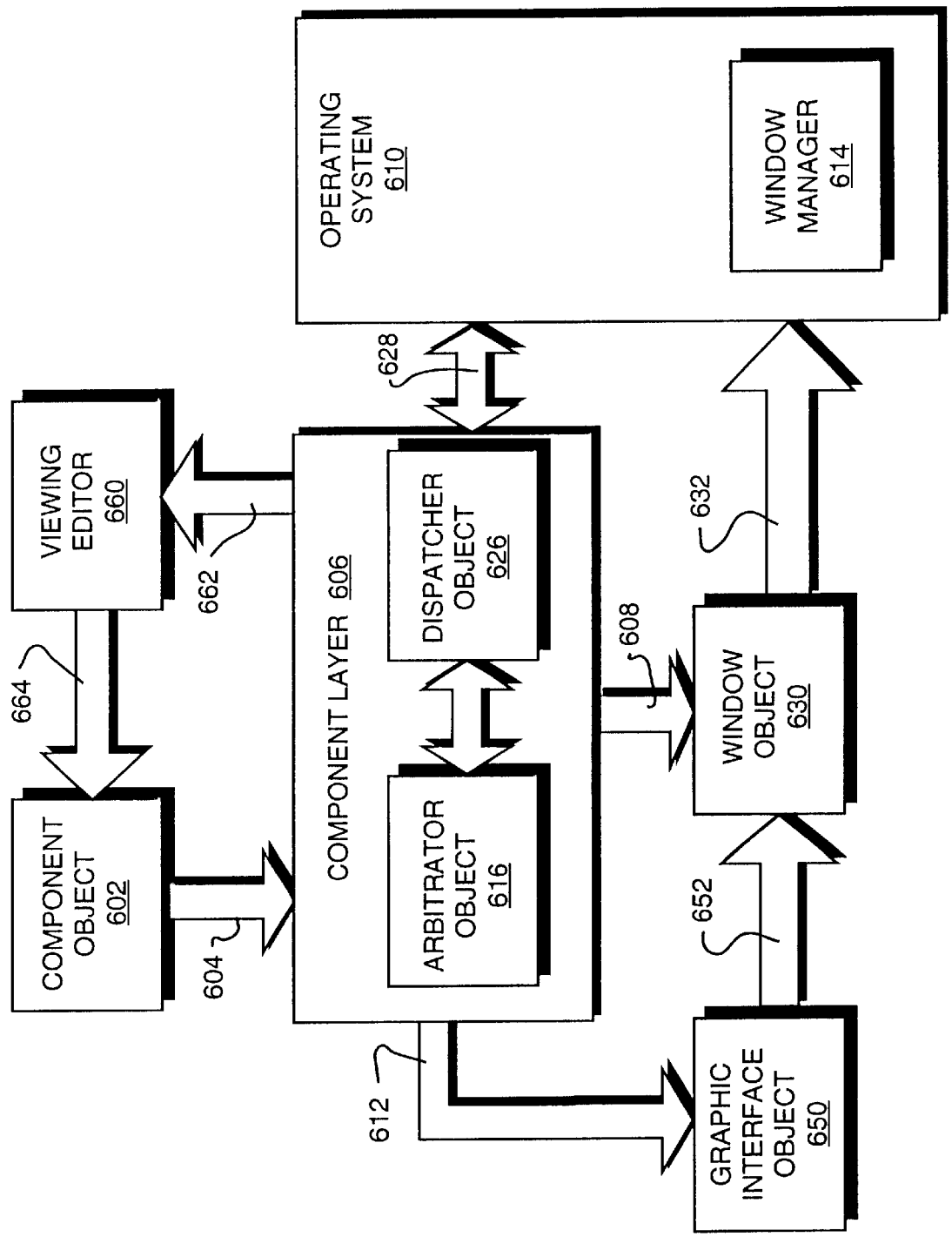
FIG. 6 is a schematic illustration of the interaction between a component, a component layer and a window manager in accordance with the invention.

In accordance with the present invention, the component 502 and windows 544 are "objects" created by the component layer 506 and the window manager 514, respectively, the latter of which may be an object-oriented program. Interaction between a component, component layer and a window manager is illustrated in greater detail in FIG. 6.

In general, the component layer 606 interfaces with the window manager 614 by creating and manipulating objects.

The window manager itself may be an" object which is created when the operating system is started. Specifically, the component layer creates window objects 630 that cause the window manager to create associated windows on the display screen. This is shown schematically by an arrow 608. In addition, the component layer 606 creates individual graphic interface objects 650 that are stored in each window object 630, as shown schematically by arrows 612 and 652. Since many graphic interface objects may be created in order to display many interface elements on the display screen, the window object 630 communicates with the window manager by means of a sequence of drawing commands issued from the window object to the window manager 614, as illustrated by arrow 632.

As noted, the component layer 606 functions to embed components within one another to form a compound document having mixed data types and formats. Many different viewing editors may work together to display, or modify, the data contents of the document. In order to direct keystrokes and mouse events initiated by a user to the proper components and editors, the component layer 606 includes an arbitrator 616 and a dispatcher 626.

The dispatcher is an object that communicates with the operating system 610 to identify the correct viewing editor 660, while the arbitrator is an object that informs the dispatcher as to which editor "owns" the stream of keystrokes or mouse events. Specifically, the dispatcher 626 receives these "human-interface" events from the operating system 610 (as shown schematically by arrow 628) and delivers them to the correct viewing editor 660 via arrow 662. The viewing editor 660 then modifies or displays, either visually or acoustically, the contents of the data types.

Although OOP offers significant improvements over other programming concepts, software development still requires significant outlays of time and effort, especially if no pre-existing software is available for modification. Consequently, a prior art approach has been to provide a developer with a set of predefined, interconnected classes which create a set of objects and additional miscellaneous routines that are all directed to performing commonly-encountered tasks in a particular environment. Such predefined classes and libraries are typically called "frameworks" and essentially provide a pre-fabricated structure for a working document.

For example, a framework for a user interface might provide a set of predefined graphic interface objects which create windows, scroll bars, menus, etc. and provide the support and "default" behavior for these interface objects. Since frameworks are based on object-oriented techniques, the predefined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of that original program. In addition, developers are not blindly working through layers of code because the framework provides architectural guidance and modeling and, at the same time, frees the developers to supply specific actions unique to the problem domain.

There are many kinds of frameworks available, depending on the level of the system involved and the kind of problem to be solved. The types of frameworks range from high-level frameworks that assist in developing a user interface, to lower-level frameworks that provide basic system software services such as communications, printing, file systems support, graphics, etc. Commercial examples of application-type frameworks include MacApp (Apple), Bedrock (Symantec), OWL (Borland), NeXT Step App Kit (NeXT) and Smalltalk-80 MVC (ParcPlace).

While the framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, frameworks generally consist of one or more object "layers" on top of a monolithic operating system and even with the flexibility of the object layer, it is still often necessary to directly interact with the underlying system by means of awkward procedure calls.

In the same way that a framework provides the developer with prefab functionality for a document, a system framework, such as that included in the preferred embodiment, can provide a prefab functionality for system level services which developers can modify or override to create customized solutions, thereby avoiding the awkward procedural calls necessary with the prior art frameworks. For example, consider a customizable network interface framework which can provide the foundation for browsing and accessing information over a computer network. A software developer who needed these capabilities would ordinarily have to write specific routines to provide them. To do this with a framework, the developer only needs to supply the characteristic and behavior of the finished output, while the framework provides the actual routines which perform the tasks.

A preferred embodiment takes the concept of frameworks and applies it throughout the entire system, including the document, component, component layer and the operating system. For the commercial or corporate developer, systems integrator, or OEM, this means all of the advantages that have been illustrated for a framework, such as MacApp, can be leveraged not only at the application level for things such as text and graphical user interfaces, but also at the system level for such services as printing, graphics, multi-media, file systems and, as described herein, network-specific operations.

Referring again to FIG. 6, the window object 630 and the graphic interface object 650 are elements of a graphical user interface of a network component system having a customizable framework for greatly enhancing the ability of a user to efficiently access information from a network resource on computer networks by creating an encapsulated entity that contains a reference to that resource. The encapsulated entity is preferably implemented as a network component of the system and stored as a visual object, e.g., an icon, for display on a graphical user interface. Such visual display allows a user to easily manipulate the entity component to display the contents of the resource on a computer screen or to electronically forward the entity over the networks.

Figure 7:
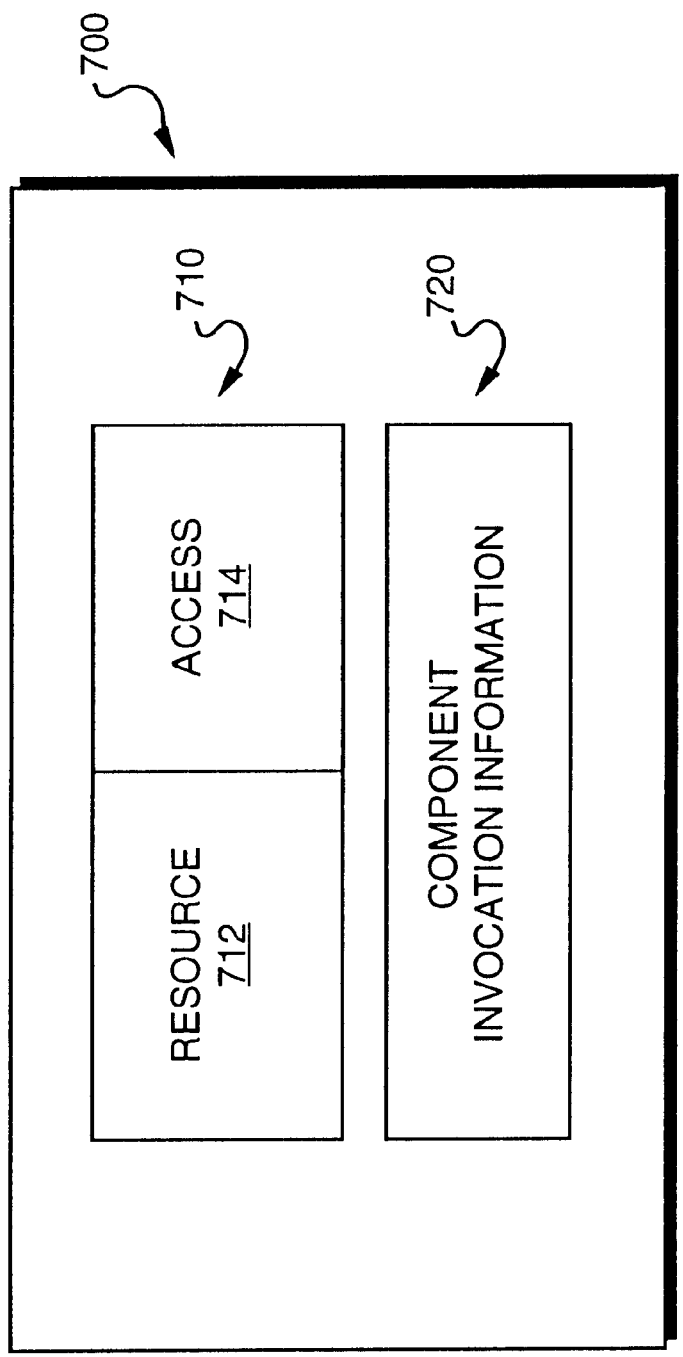
FIG. 7 is a schematic diagram of an illustrative encapsulated network entity object in accordance with the invention.

Furthermore, the reference to the network resource is a pointer that identifies the network address of the resource, e.g., a Gopher browser, a Web page or an E-mail message. FIG. 7 is a schematic diagram of an illustrative encapsulated network entity object 700 containing a pointer 710. 1n one embodiment of the invention, the pointer may be a uniform resource locator (URL) having a first portion 712 that identifies the particular network resource and a second portion 714 that specifies the means for accessing that resource. More specifically, the URL is a string of approximately 50 characters that describes the protocol used to address the target resource, the server on which the resource resides, the path to the resource and the resource filename. It is to be understood, however, that other representations of a "pointer" are included within the principles of the invention, e.g., a Post Office Protocol (POP) account and message identification (ID).

In addition to storing the pointer, the encapsulated entity also contains information 720 for invoking appropriate network components needed to access the resource. Communication among these network components is achieved through novel application programming interfaces (APIs). These APIs are preferably delivered in the form of objects in a class hierarchy that is extensible so that developers can create new components. From an implementation viewpoint, the objects can be subclassed and can inherit from base classes to build customized components that allow users to see different kinds of data using different kinds of protocols, or to create components that function differently from existing components.

In accordance with the invention, the customized framework has a set of interconnected abstract classes for defining network-oriented objects used to build the customized network components. These abstract classes include CyberItem, CyberStream and CyberExtension and the objects they define are used to build the novel network components. A description of these abstract classes is provided in copending and commonly assigned U.S. patent application titled Extensible, Replaceable Network Component System, filed May 5, 1995, which application is incorporated by reference as though fully set forth herein.

Specifically, the CyberItem class defines the encapsulated entity object which interacts with objects defined by the other abstract classes of the network system to "transport" the user to the network location, i.e., remotely access information from the referenced resource and display that formation to the user at the computer. Since these objects are integral elements of the cooperating component architecture, any type of encapsulated network entity may be developed with consistent behaviors, i.e., these entities may be manifested as visual objects that can be distributed and manipulated iconically.

Figure 8:
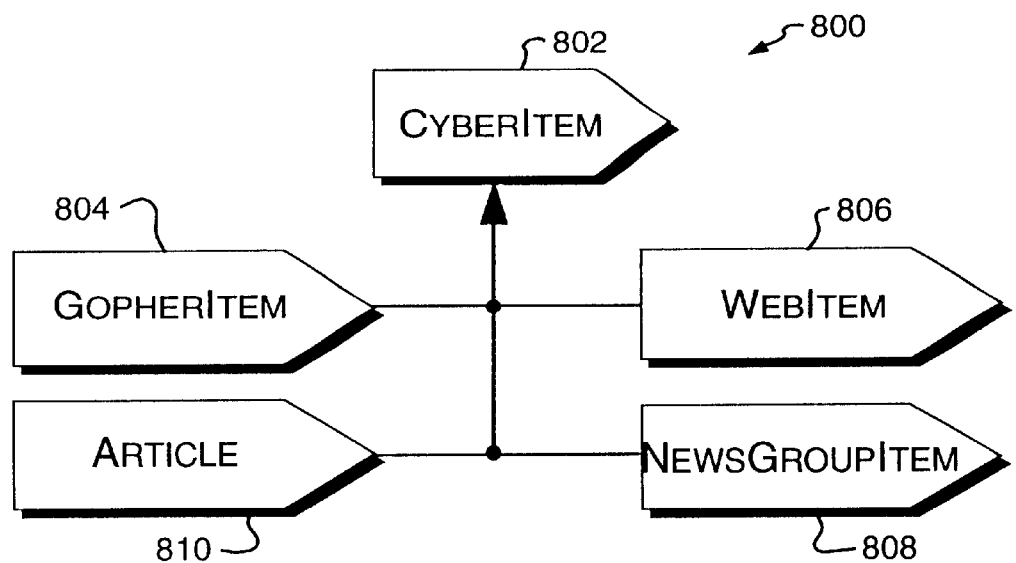
FIG. 8 is a simplified class heirarchy diagram illustrating a base class CyberItem, and its associated subclasses, used to construct network component objects in accordance with the invention.

FIG. 8 illustrates a simplified class hierarchy diagram 800 of the base class CyberItem 802 used to construct the encapsulated network entity component object 602. In accordance with the illustrative embodiment, subclasses of the CyberItem base class are used to construct various network component objects configured to provide such services for the novel network-oriented component system. For example, the subclass GopherItem 804 is derived from the CyberItem class 802 and encapsulates a network entity component object representing a "thing in Gopher space", such as a Gopher directory.

Since each of the classes used to construct these network component objects are subclasses of the CyberItem base class, each class inherits the functional operators and methods that are available from that base class. Accordingly, methods associated with the Cyberitem base class for, e.g., instructing an object to open itself, are assumed by the subclasses to allow the network components to display CyberItem objects in a consistent manner.

Figure 9:
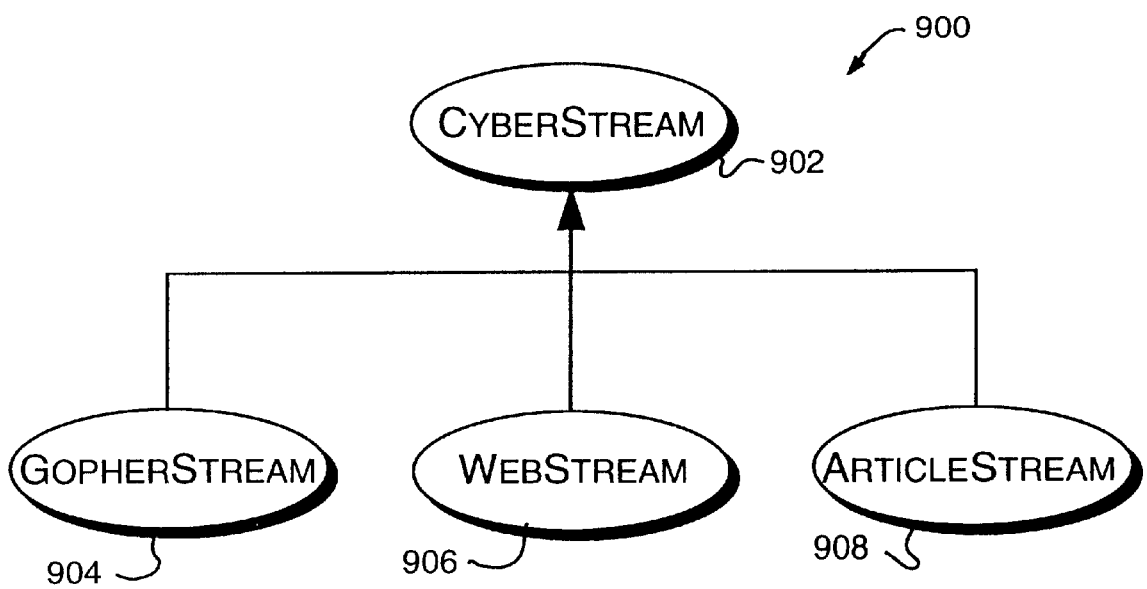
FIG. 9 is a simplified class heirarchy diagram illustrating a base class CyberStream, and its associated subclasses, in accordance with the invention.

In some instances, a CyberItem object may need to spawn a CyberStream object in order to obtain the actual data for the object it represents. FIG. 9 illustrates a simplified class hierarchy diagram 900 of the base class CyberStream 902 which is an abstraction that serves as an API between a component configured to display a particular data format and the method for obtaining the actual data. Specifically, a CyberStream object contains the software commands necessary to create a "data stream" for transfering information from one object to another. According to the invention, a GopherStream subclass 904 is derived from the CyberStream base class 902 and encapsulates a network object that implements the Gopher protocol.

Figure 10:
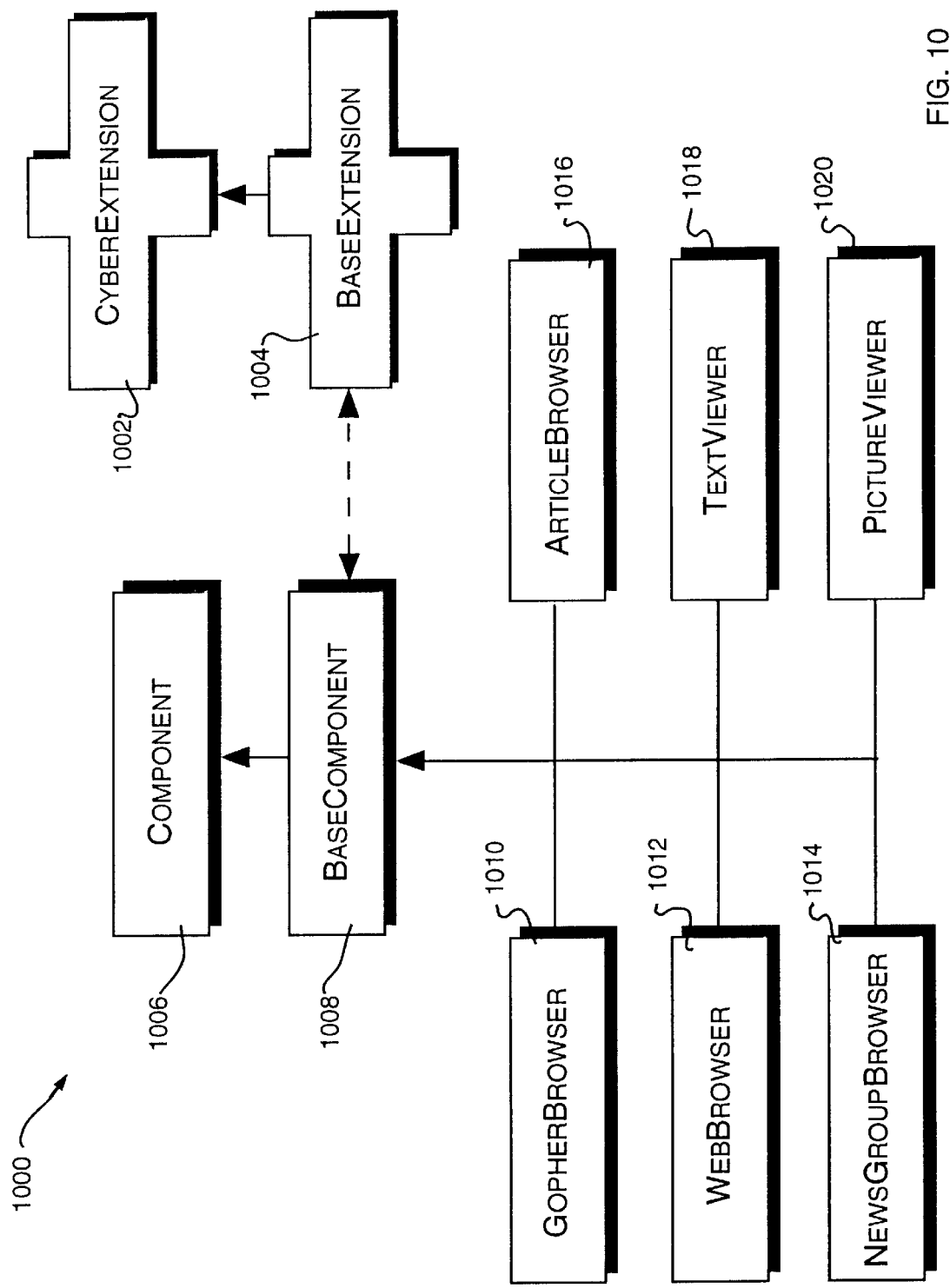
FIG. 10 is a simplified class hierarchy diagram illustrating a base class CyberExtension, and its associated subclasses, in accordance with the present invention.

FIG. 10 is a simplified class hierarchy diagram 1000 of the base class CyberExtension 1002 which represents additional behaviors provided to components of the underlying software component architecture. For example, CyberExtension objects add functionality to, and extend the APIs of, existing components so that they may communicate with the novel network components, such as the encapsulated entity objects. As a result, the CyberExtension base class 1002 operates in connection with a Component base class 1006 through their respective subclasses BaseExtension 1004 and BaseComponent 1008.

CyberExtension objects are used by components that display the contents of CyberItem objects; this includes browser-like components, such as a Gopher browser or Web browser, along with viewer-like components, such as JPEG, MPEG or text viewers. The CyberExtension objects also keep track of the CyberItem objects which these components are responsible for displaying. In accordance with the invention, the class GopherBrowser 1010 may be used to construct a Gopher-like network browsing component and the class WebBrowser 1012 may be used to construct a Web-like network browsing component.

FIGS. 11A–11D are highly schematized diagrams illustrating the interactions between the novel network-oriented components, including the encapsulated (CyberItem) network entity component according to the invention. It is to be understood that the components described herein are objects constructed from the interconnected abstract classes. In general, a user has "double clicked" on an icon of a graphical user interface 1100 displayed on a computer screen. The icon represents, e.g., a Gopher directory displayed in a Gopher browser application. Initially, a GopherBrowser component 1110 displays two icons representing CyberItem components, the icons labeled (GopherItem) Happy Face 1104 and (GopherItem) Home Page 1106. These latter components represent the contents of a Gopher directory labeled (GopherItem) Apple 1114.

Figure 11A:
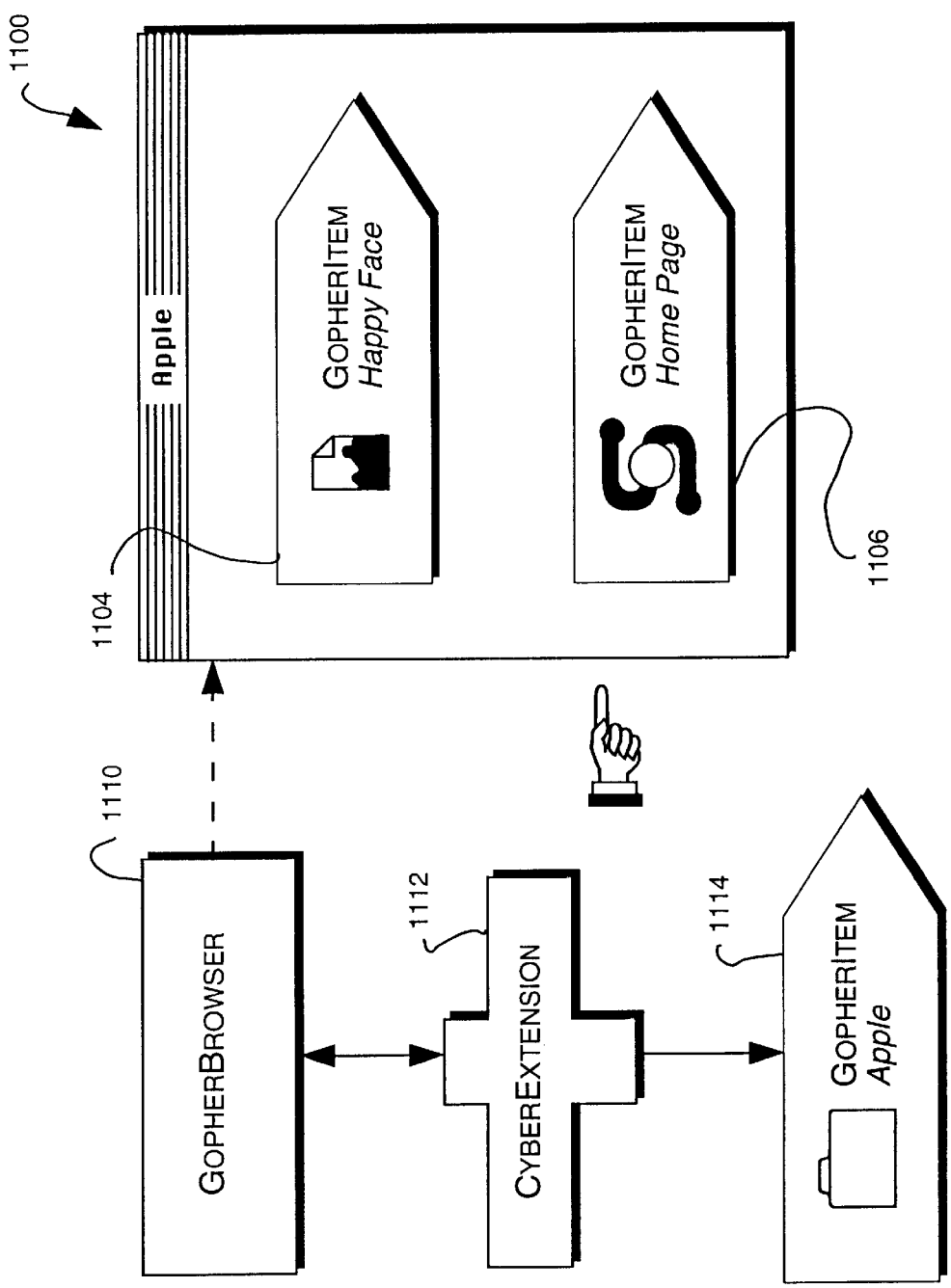
FIGS. 11A–11D are highly schematized diagrams illustrating the interactions between the network component objects, including the encapsulated network entity object of FIG. 7.

In FIG. 11A, the left side of the diagram illustrates a GopherBrowser component 1110 that is displayed on the computer screen, i.e., the right side of the diagram. The GopherBrowser component has a CyberExtension component 1112 which keeps track of the GopherItem components. When the user double clicks on the Home Page GopherItem icon 1106, the GopherBrowser component 1110 receives this event and issues a call to an "Open" method of a Home Page GopherItem component; this call instructs the GopherItem component 1106 to open itself.

Figure 11B:
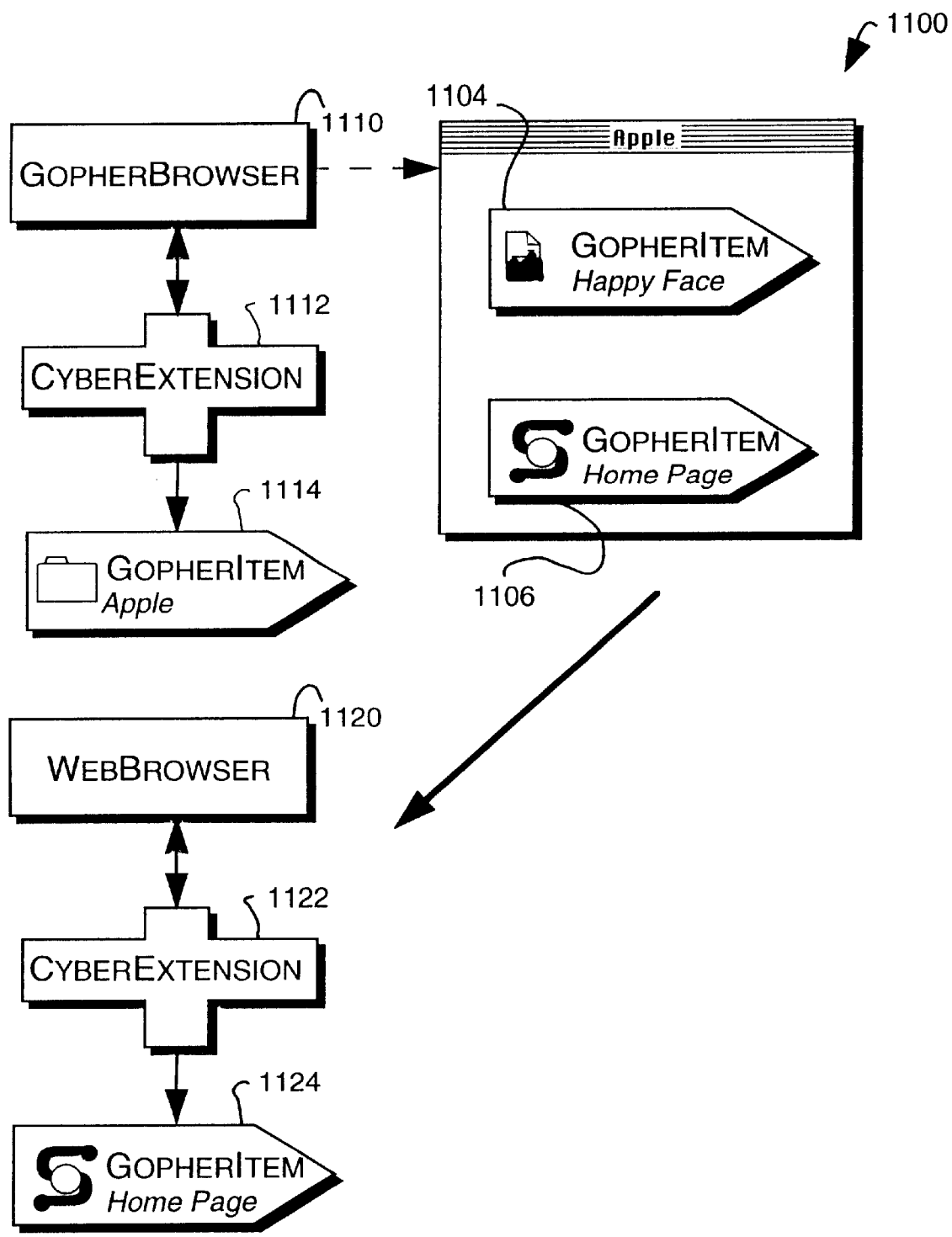

Specifically, and referring to FIG. 11B, the GopherItem component 1106 creates a component of the appropriate type to display itself For this example, the GopherItem preferably creates a WebBrowser component 1120. Once created, the WebBrowser component further creates a CyberExtension component 1122 for storing the Home Page GopherItem component (now shown at 1124). In accordance with the invention, the Home Page GopherItem component is a network entity containing a pointer that points to the network address of a Gopher server storing the appropriate Web page.

Figure 11C:
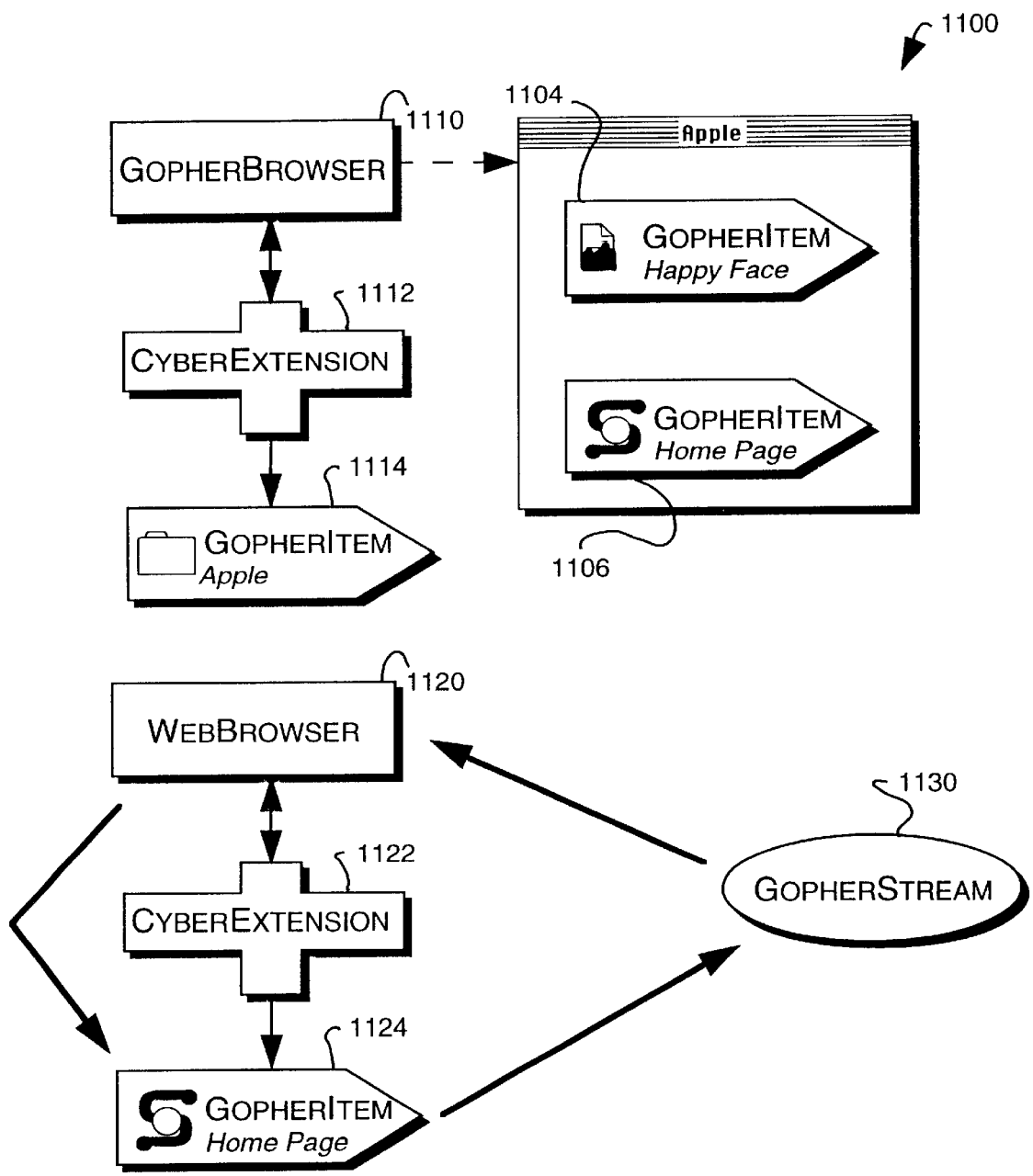

In FIG. 11C, the CyberExtension component 1122 then notifies the WebBrowser component 1120 that it has been assigned a GopherItem component 1124 to display. The WebBrowser component 1120 calls a method CreateCyberStream of the GopherItem to create a GopherStream component 1130 for downloading the appropriate data. Thereafter, the WebBrowser component 1120 begins asychronously downloading HTML document from the appropriate Gopher server (not shown).

Figure 11D:
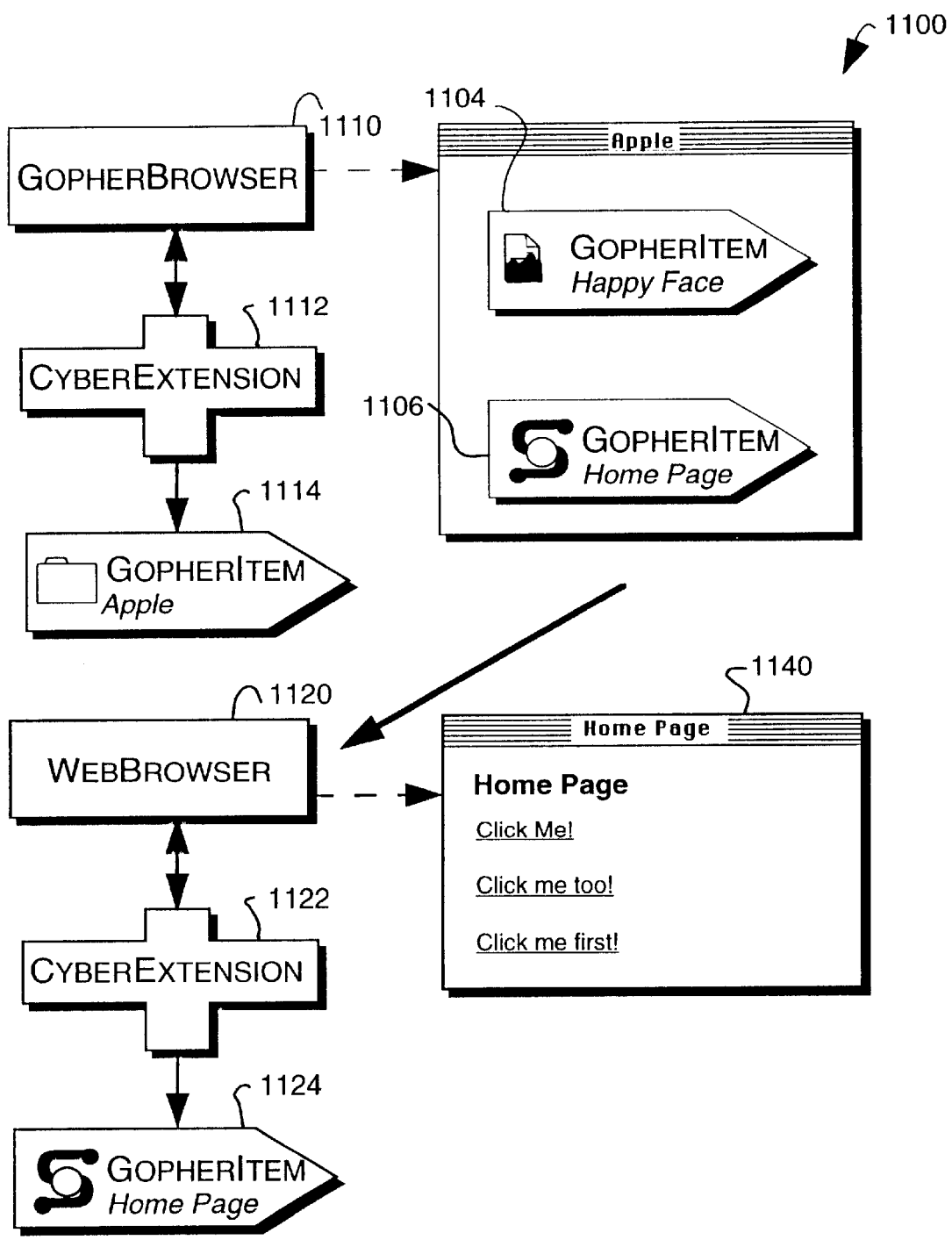
Figure 12:
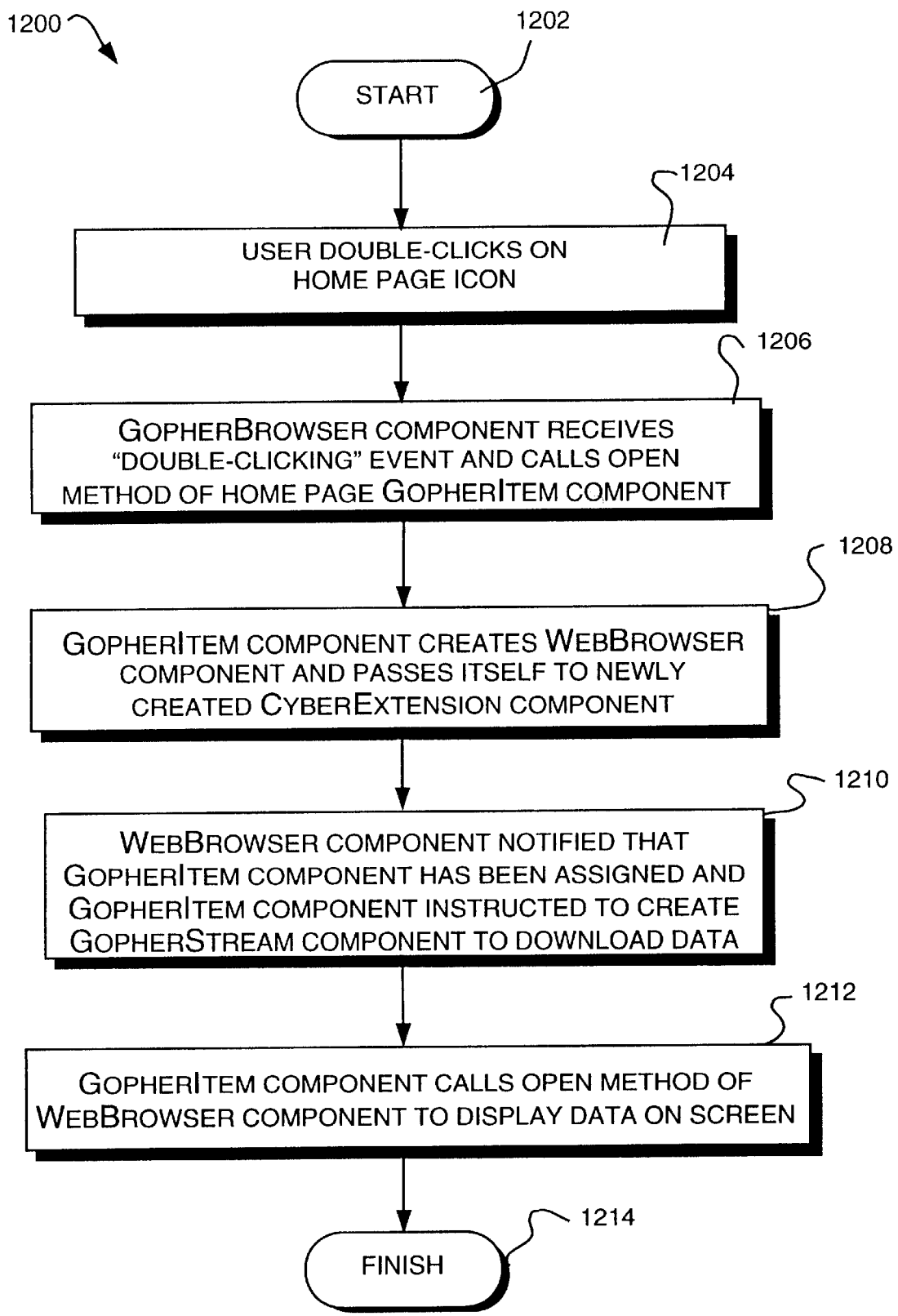
FIG. 12 is an illustrative flowchart of the sequence of steps involved in invoking, and accessing, information from a referenced network resource.

Control of the execution of this process then returns to the GopherItem component 1124 in FIG. 11D. This component, in turn, issues a call to an Open method of the WebBrowser component 1120, which causes the downloaded HTML document to appear on the screen (now shown at 1140). For a further understanding of the invention, FIG. 12 provides an illustrative flowchart 1200 of the sequence of steps involved in invoking, and accessing, information from a referenced network resource, as described above.

In summary, the network-oriented component system provides a customizable framework that enables a user to create an encapsulated entity containing a reference to a network resource on a computer network. Advantageously, the inventive encapsulation technique allows a user to simply manipulate visual objects when accessing information on the network. Instead of having to type the destination address of a resource, the user can merely "drag and drop" the icon associated with entity anywhere on the graphical user interface. When the user "double clicks" on the icon, the entity opens up in a window and displays the contents of the resource at that network location. Since the address is encapsulated within the network reference entity, the user does not have to labor with typing of the cumbersome character string.

While there has been shown and described an illustrative embodiment for implementing an extensible and replaceable network component system, it is to be understood that various other adaptations and modifications may be made within the spirit and scope of the invention. For example, additional system software routines may be used when implementing the invention in various applications. These additional system routines include dynamic link libraries (DLL), which are program files containing collections of window environment and networking functions designed to perform specific classes of operations. These functions are invoked as needed by the software component layer to perform the desired operations. Specifically, DLLs, which are generally well-known, may be used to interact with the component layer and window manager to provide network-specific components and functions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A computer readable medium containing executable program instructions for efficiently accessing information from a network resource located on a computer network for display on a computer coupled to the network, the network resource having one or more associated data types, each data type being accessible by a corresponding object-oriented software component, the executable program instructions comprising program instructions for:

defining at least one network component that integrates the object-oriented software components needed to access the one or more data types associated with the network resource;

creating an encapsulated entity component containing a reference to a location of the network resource on the computer network, the encapsulated entity component also identifying the at least one network component that was defined for the network resource;

storing the encapsulated entity component as a visual object on the computer;

in response to manipulation of the visual object with a pointing device, displaying the contents of the network resource on a screen of the computer by invoking the object-oriented software components integrated by the at least one identified network component.

2. The computer readable medium of claim 1 wherein the program instruction for displaying comprises the step of invoking a first network component for displaying the contents of the referenced network resource on the screen, the first network component comprising a browsing component.

3. The computer readable medium of claim 2 wherein the program instruction for displaying further comprises the step of invoking a second network component for transferring the contents of the referenced network resource to the first network component, the second network component comprising a data stream component.

4. The computer readable medium of claim 3 further comprising a program instruction for creating objects for communication among the encapsulated entity and network components through application programming interfaces.

5. The computer readable medium of claim 4 wherein the program instruction for creating comprises a further program instruction for constructing the encapsulated entity component from an Item object defined by an Item object class.

6. The computer readable medium of claim 5 wherein the program instruction for creating comprises a further program instruction for spawning a Stream object from the Item object, the Stream object representing the data stream.

7. The computer readable medium of claim 1 wherein the reference to the network resource is a pointer that identifies the address of the network resource on a computer network.

8. The computer readable medium of claim 7 wherein the pointer is a uniform resource locator.

9. The computer readable medium of claim 8 wherein the uniform resource locator has a first portion that identifies the network resource and a second portion that specifies a means for accessing that resource.

10. The computer readable medium of claim 9 wherein the uniform resource locator is a character string that describes a protocol used to address the network resource, a server on which the resource resides, a path to the resource and a resource filename.

11. The computer readable medium of claim 10 wherein the pointer is a post office protocol account.

\* \* \* \* \*